(12) United States Patent
Garcea et al.

(10) Patent No.: US 7,636,708 B2
(45) Date of Patent: Dec. 22, 2009

(54) DISTRIBUTED DATA GATHERING AND AGGREGATION AGENT

(75) Inventors: Federico Garcea, Seattle, WA (US); Michael S. Murstein, Kirkland, WA (US); Roger W. Sprague, Redmond, WA (US); Alexander M. Sutton, Seattle, WA (US); Michael W. Thomas, Bellevue, WA (US); Giedrius Zizys, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 604 days.

(21) Appl. No.: 10/924,049

(22) Filed: Aug. 23, 2004

(65) Prior Publication Data

US 2005/0021748 A1    Jan. 27, 2005

Related U.S. Application Data

(62) Division of application No. 09/710,172, filed on Nov. 10, 2000, now Pat. No. 7,111,059.

(51) Int. Cl.
G06F 7/00 (2006.01)
G06F 17/00 (2006.01)
G06F 17/30 (2006.01)

(52) U.S. Cl. .................. 707/2; 707/3; 707/104.1
(58) Field of Classification Search ............ 707/3, 707/10, 100, 102, 1–4, 104.1, 200–201; 702/182, 186; 709/224
See application file for complete search history.

(56) References Cited

U.S. PATENT DOCUMENTS

| | | | |
|---|---|---|---|
| 5,481,481 A | 1/1996 | Frey et al. | |
| 5,483,468 A | 1/1996 | Chen et al. | |
| 5,491,796 A | 2/1996 | Wanderer et al. | |
| 5,581,482 A | 12/1996 | Wiedenman et al. | |
| 5,819,028 A * | 10/1998 | Manghirmalani et al. | 714/57 |
| 5,822,615 A | 10/1998 | Yamashita et al. | |
| 5,862,333 A | 1/1999 | Graf | |
| 5,870,739 A | 2/1999 | Davis, III et al. | |
| 5,923,874 A * | 7/1999 | Koenig | 718/100 |
| 5,966,706 A | 10/1999 | Biliris et al. | |
| 6,049,798 A | 4/2000 | Bishop et al. | |
| 6,108,782 A | 8/2000 | Fletcher et al. | |
| 6,148,298 A | 11/2000 | LaStrange et al. | |
| 6,199,018 B1 | 3/2001 | Quist et al. | |
| 6,263,368 B1 | 7/2001 | Martin | |
| 6,275,953 B1 | 8/2001 | Vahalia et al. | |

(Continued)

OTHER PUBLICATIONS

D.C.A. Bulterman, et al., "Application-level Performance Prediction Tools for Network-Based Systems", IEEE Network, vol. 1, No. 3, Jul. 1987, p. 6-12.

(Continued)

*Primary Examiner*—Hung T Vy
*Assistant Examiner*—Merilyn P Nguyen
(74) *Attorney, Agent, or Firm*—Rick D. Nydegger

(57) ABSTRACT

A system and method is provided for gathering and aggregating operational metrics (e.g., performance metrics, process events, health monitor state, server state) for a plurality of members as a single entity and for a plurality of entities as a singular entity. The system and method provides for operational metrics of members and entities to be aggregated and retrieved as a single result set, such that entity wide operational metrics can be acquired, monitored and displayed as a single entity.

16 Claims, 10 Drawing Sheets

U.S. PATENT DOCUMENTS

| | | | |
|---|---|---|---|
| 6,477,483 B1 | 11/2002 | Scarlat et al. | |
| 6,571,285 B1 | 5/2003 | Groath et al. | |
| 6,633,882 B1 | 10/2003 | Fayyad et al. | |
| 6,636,585 B2* | 10/2003 | Salzberg et al. | 379/22 |
| 6,654,782 B1 | 11/2003 | O'Brien et al. | |
| 6,691,165 B1 | 2/2004 | Bruck et al. | |
| 6,694,362 B1 | 2/2004 | Secor et al. | |
| 6,748,555 B1* | 6/2004 | Teegan et al. | 714/38 |
| 6,754,470 B2* | 6/2004 | Hendrickson et al. | 455/67.11 |
| 6,760,763 B2 | 7/2004 | Jennings et al. | |
| 6,789,046 B1 | 9/2004 | Murstein et al. | |
| 6,789,054 B1* | 9/2004 | Makhlouf | 703/6 |
| 6,850,974 B2 | 2/2005 | Schweitzer et al. | |
| 6,945,458 B1 | 9/2005 | Shah et al. | |
| 6,993,454 B1 | 1/2006 | Murstein et al. | |
| 7,031,953 B2* | 4/2006 | Shah et al. | 707/2 |
| 7,093,005 B2 | 8/2006 | Patterson | |
| 7,100,195 B1 | 8/2006 | Underwood | |
| 7,181,743 B2 | 2/2007 | Werme et al. | |
| 7,231,445 B1 | 6/2007 | Aweya et al. | |
| 7,299,276 B1 | 11/2007 | Strawn | |
| 2001/0049717 A1 | 12/2001 | Freeman et al. | |
| 2002/0013843 A1 | 1/2002 | Schweitzer et al. | |
| 2002/0069037 A1 | 6/2002 | Hendrickson et al. | |
| 2003/0086536 A1 | 5/2003 | Salzberg et al. | |
| 2005/0021306 A1 | 1/2005 | Garcea et al. | |
| 2005/0021546 A1 | 1/2005 | Garcea et al. | |
| 2005/0021748 A1 | 1/2005 | Garcea et al. | |
| 2005/0027727 A1 | 2/2005 | Garcea et al. | |

OTHER PUBLICATIONS

Chug-Sing Yang, et al., "Efficient Content Placement and Management on Cluster-Based Web Servers", NOMS 2000. 2000 IEEE/IFIP Network Operations and Management Symposium 'The Networked Planet: Management Beyond 2000', Apr. 10-14, 2000, p. 463-473.

C. Kopp, "Managing Cluster Computers", Dr. Dopp's Journal, vol. 25, No. 7, Jul. 2000, p. 21-31.

A. Ledeczi, et al., "Synthesis of Self-Adaptive Software", 2000 IEEE Aerospace Conference Proceedings. vol. 4, Mar. 18-25, 2000, p. 501-507.

A. Lusiani, "Process to Process Communication Over Fastbus in the Data Acquisition System of the ALEPH TPC", IEEE Transactions on Nuclear Science, vol. 14, No. 1, pt. 1, Feb. 1994, p. 138-141.

C. Mas, et al., "An Efficient Algorithm for Locating Soft and Hard Failures in WDM networks", IEEE Journal on Selected Areas in Communications, vol. 18, No. 10, Oct. 2000, p. 1900-1911.

C. Roth, et al., "PowerPC/sup TM/Performance Monitor Evolution", 1997 IEEE International Performance, Computing and Communications Conference, Feb. 5-7, 1997, p. 331-336.

Yew-Huey Liu, et al., "A Distributed Connection Manager Interface for Web Services on IBM SP Systems", Proceedings. 1996 International Conference on Parallel and Distributed Systems, 306 Jun. 1996, p. 2-9.

"Microsoft Windows Management Instrumentation Scripting", http://msdn.microsoft.com/library/backgrnd/html/wmiscript.htm, Apr. 1999, (18 pages).

Paul Maritz; "Developing Web Applications", Press Briefing, http://www.microsoft.com/presspass/exec/paul/09-13webdev.asp, Sep. 13, 1999, (17 pages), San Francisco, CA.

U.S. Appl. No. 10/903,764, Murstein, et al.

R. Butler, et al. "A National-Scale Authentication Infrastructure", Computer, Dec. 2000, pp. 60-66, vol. 33, No. 12.

R.E. Deemer, "Advanced Engineering Environments: Achieving the Vision", 2000 IEEE Aerospace Conference Proceedings, Mar. 2000, pp. 547-554, vol. 5, 18-25.

OA Dated Sep. 9, 2008 for U.S. Appl. No. 10/924,289, 20 pages.
OA Dated Sep. 23, 2008 for U.S. Appl. No. 10/924,289, 20 pages.
OA Dated Nov. 18, 2008, for U.S. Appl. No. 10/924,290, 24 pages.

* cited by examiner

DISTRIBUTED DATA GATHERING AND AGGREGATION AGENT

CROSS-REFERENCE TO RELATED APPLICATIONS

This application is a divisional application of U.S. patent application Ser. No. 09/170,172, now U.S. Pat. No. 7,111,059 entitled "DISTRIBUTED DATA GATHERING AND AGGREGATION AGENT", filed on Nov. 10, 2000. This application is also related to co-pending U.S. patent application Ser. No. 10/924,289 entitled "DISTRIBUTED DATA GATHERING AND AGGREGATION AGENT" filed on Aug. 23, 2004, and co-pending U.S. patent application Ser. No. 10/924,116 entitled "DISTRIBUTED DATA GATHERING AND AGGREGATION AGENT" filed on Aug. 23, 2004, and co-pending U.S. patent application Ser. No. 10/924,290 entitled "DISTRIBUTED DATA GATHERING AND AGGREGATION AGENT" filed on Aug. 23, 2004. The entireties of the above-noted applications are incorporated herein by reference.

TECHNICAL FIELD

The present invention relates generally to computer systems, and more particularly to a system and method for gathering and aggregating operational metrics of a plurality of computers cooperating as an entity wherein the entity may be interfaced collectively as a whole and/or individually. Additionally, the system and method may be employed to gather and aggregate operational metrics of a plurality of entities cooperating as a higher entity where a parent entity may be interfaced directly or as part of an even higher collection of parent entities. The gathering of operational metrics is hierarchical with no predefined limits.

BACKGROUND OF THE INVENTION

With the advent of Internet applications, computing system requirements and demands have increased dramatically. Many businesses, for example, have made important investments relating to Internet technology to support growing electronic businesses such as E-Commerce. Since companies are relying on an ever increasing amount of network commerce to support their businesses, computing systems generally have become more complex in order to substantially ensure that servers providing network services never fail. Consequently, system reliability is an important aspect to the modern business model.

A first approach for providing powerful and reliable services may be associated with a large multiprocessor system (e.g., mainframe) for managing a server, for example. Since more than one processor may be involved within a large system, services may continue even if one of the plurality of processors fail. Unfortunately, these large systems may be extraordinarily expensive and may be available to only the largest of corporations. A second approach for providing services may involve employing a plurality of lesser expensive systems (e.g., off the shelf PC) individually configured as an array to support the desired service. Although these systems may provide a more economical hardware solution, system management and administration of individual servers is generally more complex and time consuming.

Currently, management of a plurality of servers is a time intensive and problematic endeavor. For example, managing server content (e.g., software, configuration, data files, components, etc.) requires administrators to explicitly distribute (e.g., manually and/or through custom script files) new or updated content and/or configurations (e.g., web server configuration, network settings, etc.) across the servers. If a server's content becomes corrupted, an administrator often has no automatic means of correcting the problem. Furthermore, configuration, load-balance adjusting/load balance tool selection, and monitoring generally must be achieved via separate applications. Thus, management of the entity (e.g., plurality of computers acting collectively) as a whole generally requires individual configuration of loosely coupled servers whereby errors and time expended are increased.

Presently, there is not a straightforward and efficient system and/or process for providing system wide operational metric data of the collection of servers. Additionally, there is no system and/or process for providing system wide operational metric data of a collection of arrays of servers. Some applications may exist that provide operational metrics of an individual server, however, these applications generally do not provide operational metrics across the logical collection of loosely coupled servers. For example, many times it is important to view information from the collection of servers to determine relevant system-wide performance. Thus, getting a quick response view of pertinent operational metrics (e.g., performance, status, health, events) associated with the plurality of servers may be problematic, however, since each server generally must be searched independently. Downloading all operational metric information from each individual server would overwhelm the network and be extremely cumbersome to an administrator to review all of the operational metric information to find problems or determine a state of the array. Furthermore, the complexity would be substantially increased for a collection of arrays.

SUMMARY OF THE INVENTION

The present invention relates to a system and method for gathering and aggregating operational metrics (e.g., performance metrics, system events, health, server state) of a plurality of entities acting as a single entity. For example, the entities may include a plurality of members (e.g., computers, servers, clusters) collectively cooperating as a whole. In accordance with the present invention, an interface may be provided wherein a consistent and unified presentation of metric information of a plurality of the entities as a whole may be obtained from any of the members associated with the entity. The system and method provides for operational metrics of members to be gathered and aggregated to provide a single result set for the entity as a whole, such that entity wide performance can be obtained from a single source or requestor.

In one aspect of the invention, the operational metric data is logged to a data store according to operational metric types. The data can be aggregated across time and then stored to the data store. The data can then be accessed by a gathering and aggregation system for aggregating the data into a single result set across members. Each operational metric type can be provided with an aggregation component adapted to transform and aggregate metric data based on the specific operational metric type. For example, if performance metrics information has been requested for the entity as a whole, a performance aggregation component matches up data point values with respect to time for each member and provides a single result set of aggregated data values to the requestor. The data can be aggregated by performing mathematical operations on each time data point for a particular metric type for each entity that provides this performance data. However, if event metrics information is requested for the entity as a whole, an event coalescing component coalesces event data from each member and provides a single result set to the requester. Each event is assigned a unique event identifier (e.g., GUID), which uniquely identifies the event. The unique event identifier allows for paging functionality, such that reduced manageable blocks or portions of event data can be provided to the requester. It is to be appreciated that multiple aggregation components can be plugged into the aggregation system for aggregating different types of metric data with respect to the operation of the entity as a whole.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
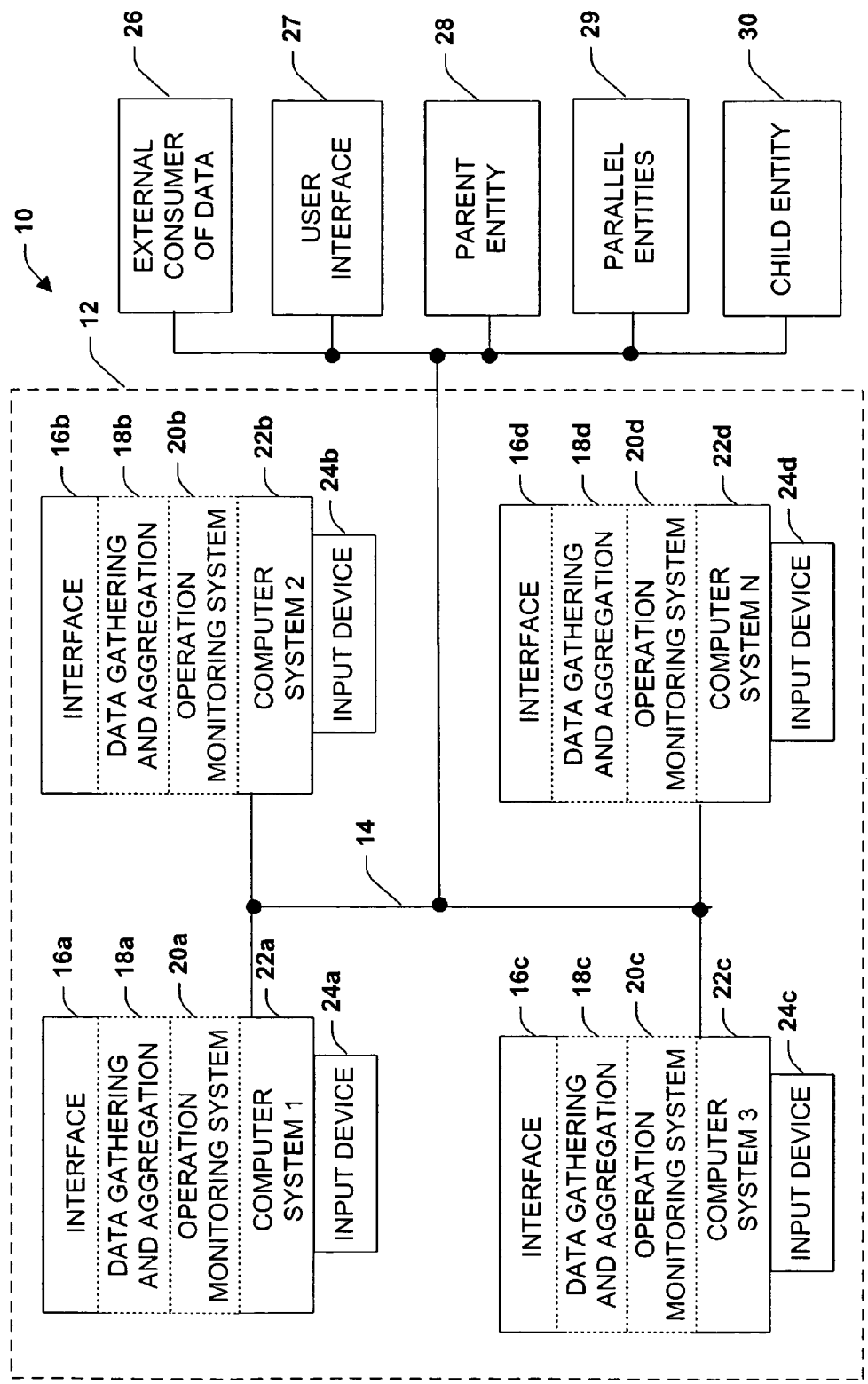
FIG. 1 illustrates a schematic block diagram illustrating an operation gathering and aggregation system of an entity in accordance with one aspect of the present invention.

The present invention is now described with reference to the drawings, wherein like reference numerals are used to refer to like elements throughout. The present invention is described with reference to a system and method for gathering and/or aggregating operational metrics from a plurality of members forming an entity. The members of the entity monitor the operational metrics and log this data locally to a data store. An interface can then request operational metrics data from the members via a gathering and aggregation system. The gathering and aggregation system requests and receives operational metrics data from the members based on a requested time period, and in some cases, a particular time resolution and an operational metric. The request can be either for a single member or from all members of the entity. The gathering and aggregation system will then aggregate and format operational metric data for a particular operational metric based on the requested time period and resolution. If the request is for an operational metric for the entity as a whole, the gathering and aggregation system will aggregate or coalesce the member data to provide an overall operational metric data set for the entity. Data that is aggregated refers to data that is manipulated such that a reduced data set or result is provided. Data that is coalesced refers to data that is not manipulated to the extent that the data set or result is reduced. The aggregated or coalesced formatted operational metric data set can then be communicated to an interface, such as a user interface for displaying the data set. Alternatively, the data set can be accessed by a local or remote process, an external user interface, an external consumer or another member or entity not part of entity from which the data set refers. The gathering and aggregation system can include a plurality of pluggable aggregation components dedicated to aggregating or coalescing a particular operational metric based on the data type of the metric.

In accordance with the present invention, an operational gathering and aggregation system is provided that greatly facilitates management and administration of an entity. The operation gathering and aggregation system interface substantially automates system information retrieval by enabling an application to retrieve the operational metric data of the entity from any of a plurality of systems operatively coupled to the entity. A consistent interface is therefore provided wherein the operation metric data of the entity may be retrieved as if the entity were a singular machine—thereby providing a substantial improvement over conventional systems that may require an administrator to individually retrieve metric data from each machine comprising the entity. Thus, the present invention saves time and administration costs associated with conventional systems. Moreover, system troubleshooting is improved since entity members may be considered as a collective whole (e.g., retrieving system wide performance) and/or individual members may be identified and operated upon.

Although the present example will be discussed with reference to a gathering and aggregation system, it is to be appreciated that information and/or data may be aggregated or coalesced based on the operational metric being gathered. Referring initially to FIG. 1, a system 10 illustrates a particular aspect of the present invention related to an operation gathering and aggregation system for gathering and aggregating or coalescing operational metrics (e.g., performance metrics, system events, system health, system status) of a plurality of members cooperating as an entity. A plurality of members (e.g., computers, servers, machines) for example, computer systems 1 through N (N being an integer) 22a through 22d may be operatively coupled to a network 14 thereby forming an entity 12.

Other sources that may not be part of the entity 12, may also be coupled to the network 14 for retrieving gathered and aggregated data from the entity 12 or for gathering and aggregating raw metric data from the entity 12 by employing its own gathering and aggregation system. For example, an external consumer of data 26 can connect to one of the computer systems 22 through the network 14 to retrieve raw or aggregated metric data or connect to one of the interfaces 16a through 16d to retrieve raw or aggregated metric data. Additionally, a separate user interface 27 can connect to one of the computer systems 22 through the network 14 to retrieve raw or aggregated metric data or connect to one of the interfaces 16a through 16d to retrieve raw or aggregated metric data. Furthermore, a parent entity 28, parallel entities 29 and/or a child entity 30 can connect to any member of the entity or to the member itself for retrieving and passing metric data between entities for gathering and/or aggregating. In order to request and provide specific gathered and aggregated operation information of the entity 12, a plurality of interfaces (e.g., computer monitor) 16a through 16d may provide output, and an input device (e.g., mouse, keyboard) 24a through 24d may provide input requests to the operation gathering and aggregation system 18a through 18d.

As depicted by the system 10, the interface 16 enables an application or process to retrieve, display or monitor the entity 12 from each member 22a-22d and/or from non-members such as any of the components 26-30. The interface 16 provides a consistent interface for an application or process to measure the operational metrics of the entity 12 as if it was a singular machine. Consequently, the user does not have to administer (e.g., gain access to each machine) and configure (e.g., download new content/software) each machine individually. Thus, time is saved and errors are mitigated. It is noted that the interface 16 generally does not have to run on each computer in the system 10. As will be described in more detail below, full entity operation monitoring may be achieved by interfacing to a single member, for example.

The interface 16 may be served with information provided from each member 22a through 22d employing any of the operation gathering and aggregation systems 18a through 18d. This may be achieved by enabling each member to distribute information to the entity 12. Therefore, the interface 16 may provide aggregated information of the entity as a whole through the operation gathering and aggregation system 18—in contrast to conventional systems wherein information of a member may be received and displayed only at the individual member employing an operation monitoring system 20a-20d. For example, computer systems 22a-22d processor performance may be displayed as an aggregation of the output of each member of the entity 12. Any of the interfaces 16a through 16d may be provided with a similar consistent result set. It is noted that the members 22a through 22d may also be entities. For example, some members could also be a collection of members represented by an entity. Thus, the entity 12 may include members that are entities in their own right.

Alternatively, the interface 16 is provided with individual operational metrics from any of the operation gathering and aggregation systems 18a through 18d by requesting this information from that particular operation gathering and aggregation system. Furthermore, entity configurations may be modified from any of the interfaces 16 by enabling the user to provide input to the interface and thereby distribute resultant modifications throughout the entity 12. This may be achieved for example, by providing the input to a single member wherein the single member may then distribute the modified configuration throughout the entity 12. It is to be appreciated that other distribution systems may be provided. For example, rather than have entity operation information centrally distributed and aggregated at the single member, individual members 22a-22d may share a master file (e.g., XML) describing the configuration information of each member.

Figure 2:
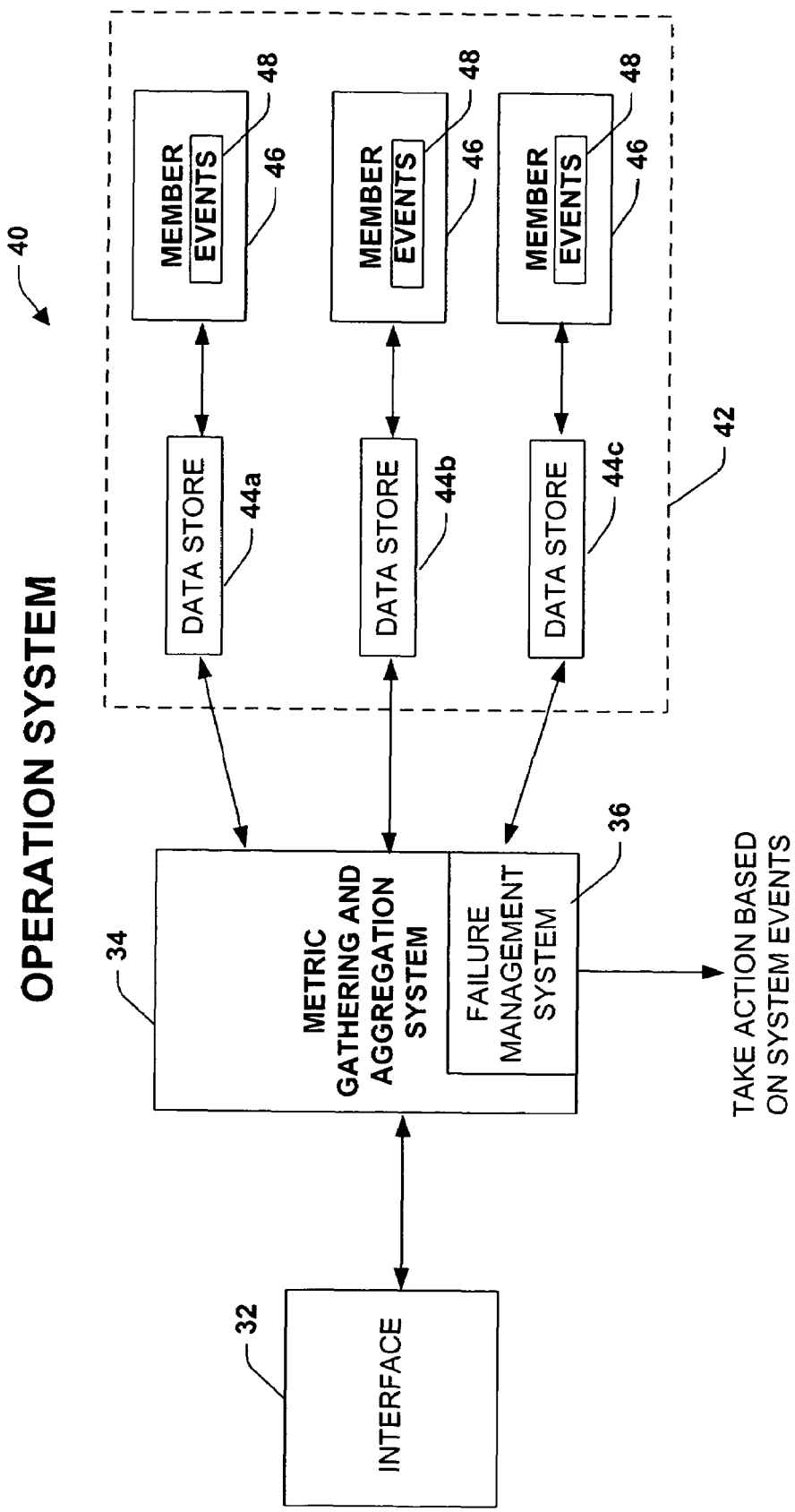
FIG. 2 is a schematic block diagram illustrating an operation and failure management system in accordance with an aspect of the present invention.

As illustrated in FIG. 2, performance and failure management may be enabled by generating events 48 for the members 46, logging the events, and monitoring the events either from an entity 32 and/or from a member 46. Events are generally data values reflecting member 46 activity and may be logged into data stores 44a-44c for each member. An operation gathering and aggregation system 34 may then query the data stores 44, and aggregate the information by performing statistical analysis (e.g., summing, averaging, RMS, etc. on the member data). For example, Windows Management Infrastructure developed by Microsoft provides an infrastructure to discover information about the system 40 and "subscribe" to various event sources (not shown). The event sources may include entity events such as related to replication of files to members, Windows events such as related to members, monitors (e.g., Microsoft Health Monitor) such as related to resources such as disk and CPU utilization, and related performance counters (e.g., Microsoft PerfMon).

As an example of aggregation, the operation gathering and aggregation system 34 may acquire events from the data stores 44 (e.g., CPU utilization) and perform an average of the member data relating to CPU utilization and thus provide an average entity CPU utilization to an interface 32. Thus, entity administration, monitoring and troubleshooting is improved over conventional systems by providing a single point of access for an application to administer and monitor entity metrics. It is to be appreciated that events 48 may also be characterized as general purpose interrupts that may be triggered at the occurrence of a predetermined condition. Thus, it is understood that a UNIX and/or other operating system may be similarly configured, for example.

Failure management may be facilitated by including a failure management system 36 (e.g., Windows Health Monitor) which provides the ability to monitor event sources such as system resources (disk, CPU), applications services, performance counters, set rules on the sources (e.g., CPU>90% for 2 minutes), and take actions when the rule thresholds are triggered. For example, if the above example rule "CPU>90% for 2 minutes" were exceeded, an application may be notified which could then send an e-mail notice and/or a script file may be generated. Rules provide a system to define metrics that determine whether a member/entity is healthy (status=ok), whether problems may occur soon (status=warning), and/or whether there is a problem (status=critical), for example. Although the failure management system 36 is illustrated as residing on the metric gathering and aggregation system 34, a failure management system may reside on each member 46.

Figure 3:
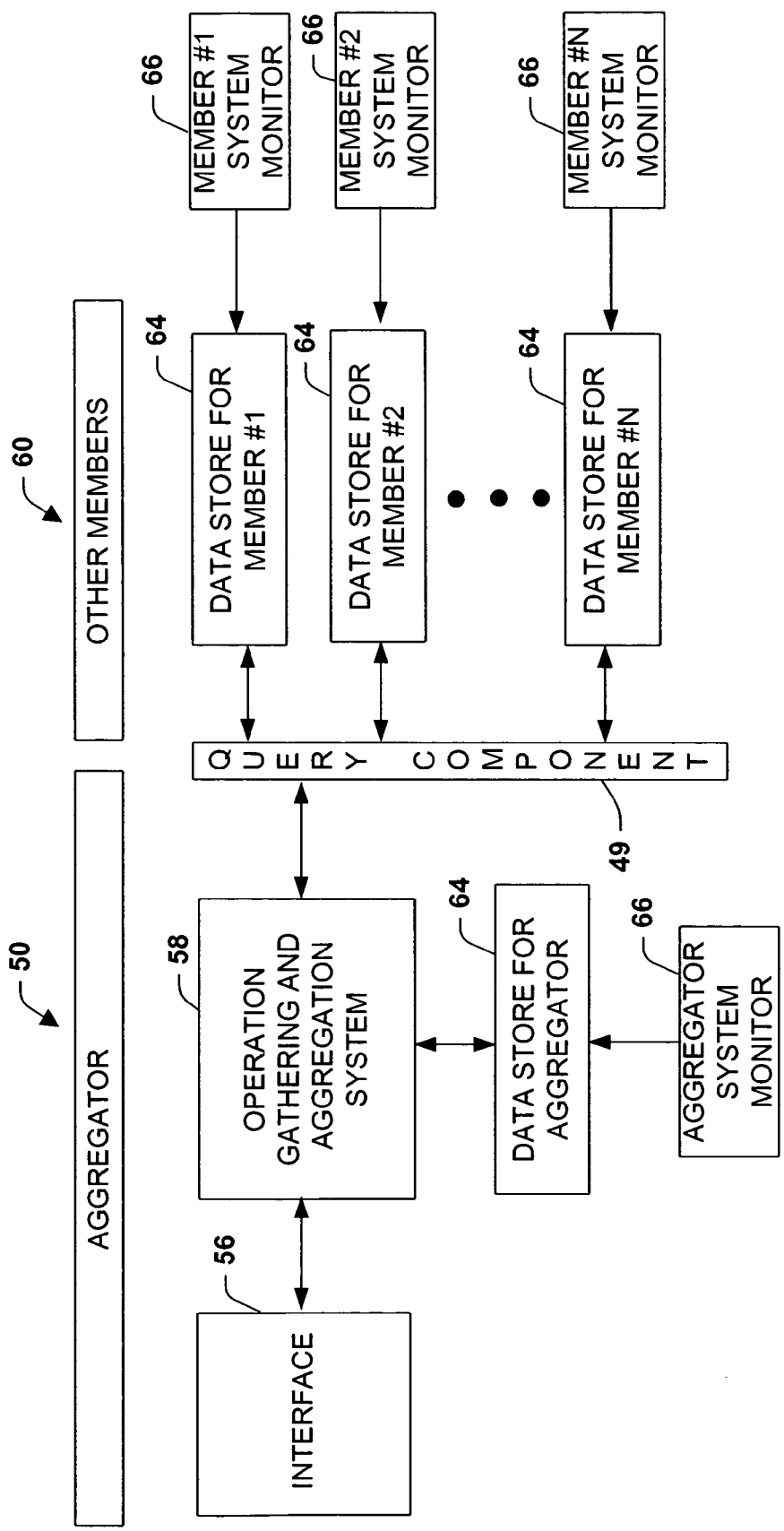
FIG. 3 is a schematic block diagram illustrating operation gathering and aggregation of an entity in accordance with one aspect of the present invention.

FIG. 3 illustrates a block schematic view of the components employed to provide both a singular member view of operation metrics and an aggregate entity view of operation metrics utilizing the gathering and aggregation system of the present invention. Each member 60 can include a system monitor component 66 adapted to monitor member specific operational metrics and log this information to a data store 64 relating to that particular member. Additionally, an aggregator member 50 can include a system monitor component 66 adapted to monitor aggregator specific operational metrics and log this information to a data store 64 relating to the aggregator member 50. For example, in the case of performance metrics, the system monitor component 66 periodically retrieves performance data values of different metrics from a performance data source (e.g., WMI). The system monitor component 66 then periodically logs the performance data values in the data store 64 related to that particular member. The counter performance data values can be repeatedly logged based on a predefined time period in respective tables, until the configurations settings are changed. It is to be appreciated that component(s) may reside between the performance monitor component 66 and the data store 64 for setting up communication links, accessing data and/or transforming data.

The system monitor component 66 or some component employed by the system monitor component 66 can then dynamically aggregate or collapse the counter performance data values based on the predefined time period to higher time periods (e.g., 10 seconds, 1 minute, 15 minutes, 1 hour, 1 day) as data time points are increased, so that data is provided for larger periods of time and higher time resolutions (e.g., aggregate or collapse across time). Various mathematical methodologies may be employed to perform such aggregation. For example, for an aggregation from ten seconds to one minute, the performance data values would include six points. The data values of these six points could be aggregated to a minute by taking the average, the minimum, the maximum, the last, the weighted average or some other value of the data values of these six points for supplying the one minute data value.

In the case of member events, the system monitor 66 or a component employed by the system monitor 66 can capture these events when they are generated and log these events to the data store 64. Additionally, health or member status based on predefined rules may be logged to the data store 64 by the system monitor 66 or queried directly by the operation gathering and aggregation member 58. It is to be appreciated that any data type relating to the operation metrics of the aggregator 50 and each member 60 may be logged to the corresponding data store 64 and/or queried directly by the aggregator 50.

An interface 56 can provide a request to the operation gathering and aggregation system 58 for operational data for a particular operation metric over a particular time period based on a single member or based on aggregation or coalescing of the operational metric over the entire entity. The operation gathering and aggregation system 58 requests this information from the data stores 64 through a query component 49. The query component 49 may include error handling. For example, if a member is not available results are returned from the other members and aggregated appropriately, while an error is returned for the unavailable member, which is not utilized to provide the aggregated results. It is to be appreciated that component(s) may reside between the operation aggregation system 58 and the query component 49 for setting up communication links, accessing data and/or transforming data. The operation metric data is provided to the operation gathering and aggregation system 58 for the particular operation metric that is requested. The operation gathering and aggregation system 58 collapses the data of a given operation metric to fit within a particular time period and resolution to be returned to the interface 56 based on the request. If the operation data is to be returned for the entire entity, the operation aggregation system 58 performs one of an aggregation or coalescing of the data based on the particular operation metric.

For example, for performance metrics the performance data values are aggregated at each data time point to provide a single result set of aggregated data time points for a specified time period and resolution. Again various mathematical methodologies may be employed to perform aggregation with respect to performance data values. For example, for aggregation of four members, the performance data values for each time data point would include four points. The data values of these four points could be aggregated by taking the average, the minimum, the maximum, the last, the weighted average or some other value of the data values of these four points for supplying a single aggregated data value for the entity. For event data, each event will be coalesced into a single event result set over a specified time period including reference to the particular member that the event had occurred. A filter component can be employed to limit the event types to be retrieved by the operation and gathering system 58 and returned to the requester. For server status, each server's status would be determined and a single status would be returned based on a rule set. For example, if nine servers were operational and one server was not, the entity status would be good. However, if any additional servers stopped operating, this would cause the system to be return an entity status of critical. Another type of operation is the health of the members. In this situation, the data is hierarchical. This type of data would be aggregated over different levels of data to return a composite result set. The health of the entity can then be determined on an entity based rule set employing the composite result set. Alternatively, metrics can be queried for each member and the metrics aggregated or coalesced. An aggregated member based rule set may then be employed to determine the health of the entity.

It is to be appreciated that not all members will return operation metric data or have operation metric data for a particular point in time. In this situation, the gathering and aggregation system disregards the lack of operation metric data and determines an appropriate aggregated operation metric data on valid data that was returned by the members. Additionally, when more data points are returned to the gathering and aggregation system than requested by the interface, the gathering and aggregation system will interpolate down the data points by calculating the width of the time slice represented by each data point (end time-start time/data points requested), grouping data points from the result sets and then taking an average or sum as appropriate.

Figure 4A:
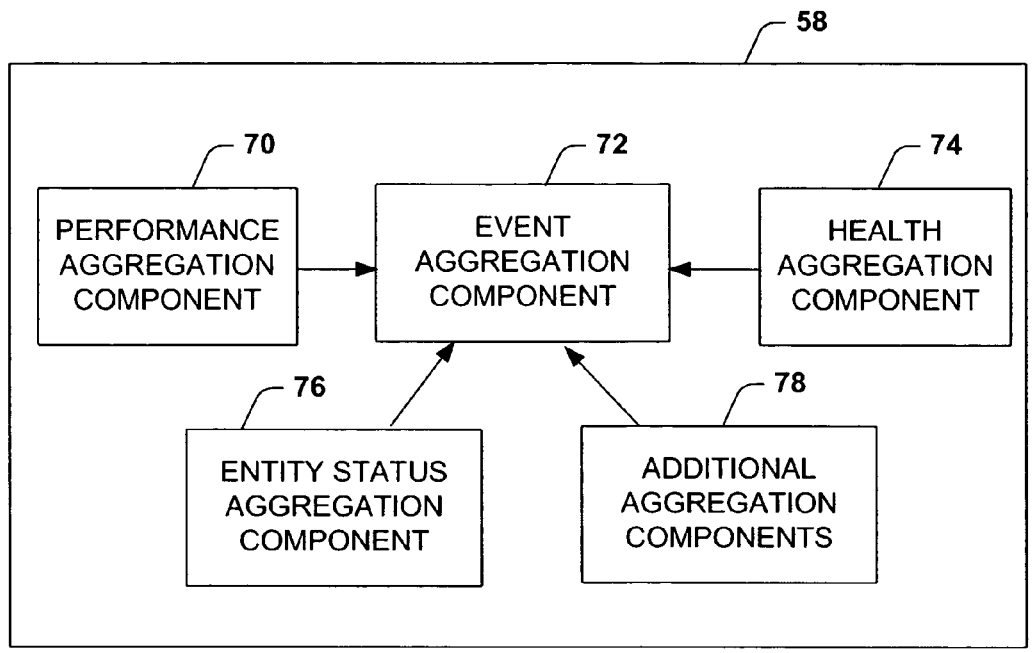
FIG. 4a is a schematic block diagram illustrating aggregation components of the operation gathering and aggregation system in accordance with one aspect of the present invention.

FIG. 4a illustrates an example of components that can form the aggregation system 58 in accordance with one aspect of the invention. The gathering and aggregation system 58 of FIG. 4a includes a number of aggregation components adapted to aggregate data according to different operation data types. The gathering and aggregation system 58 includes a performance aggregation component 70, an event aggregation component 72, a health aggregation component 74, an entity status aggregation component 76 and any additional aggregation components 78 for other operation metric types. It is to be appreciated that different methodologies may be performed in aggregating data of different operation metric types, however, the basic methodology of aggregating operation metric data for retrieving an aggregating a result set of information related to the operation of the entity as a whole is the same.

It is to be appreciated that the type of data collected by the performance aggregation component 70, the entity status aggregation component 76, the health aggregation component 74 and any additional aggregation components 78, alternatively can be collapsed into events at each member and collected by the event aggregation component 72. Additionally, data collected and aggregated by the performance aggregation component 70, the entity status aggregation component 76, the health aggregation component 74 and any additional aggregation components 78 can be collapsed into events for the entity by the event aggregation component 72. For example, if CPU utilization reaches over 90% for the entire entity (e.g., based on collected performance data), an event can be fired providing information of this condition, which can be coalesced into other events by the event aggregation component 72. Furthermore, if memory utilization of N number of systems remains below a certain level for a given period of time (e.g., based on a rule set of the health monitor component 74), an event can be fired providing this information, which can be coalesced into other events by the event aggregation component 72. It is to be appreciated that substantially any metric type can be collapsed into an event at the member level and/or the entity level.

Figure 4B:
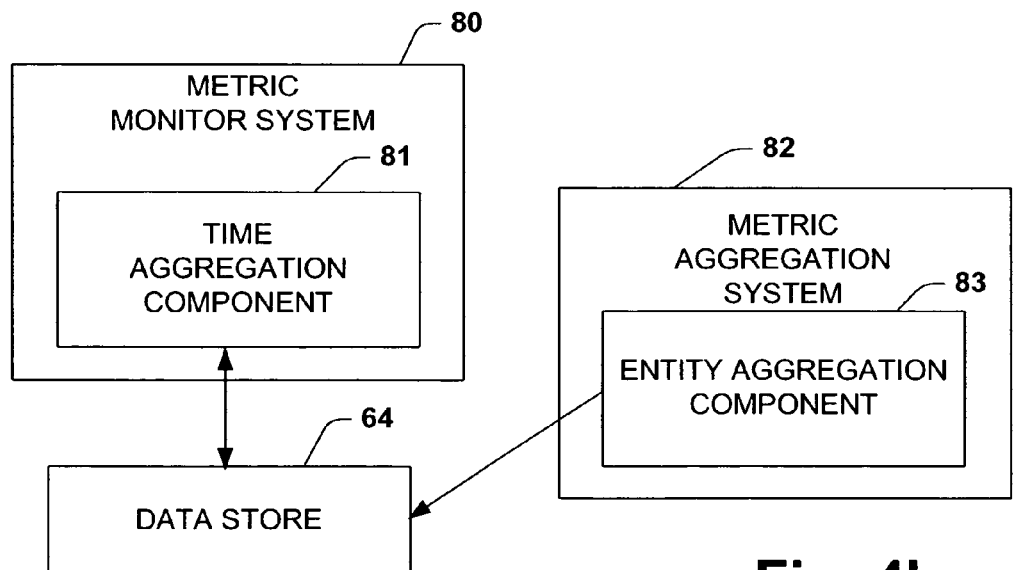
FIG. 4b is a schematic block diagram illustrating gathering and aggregation of metrics in accordance with one aspect of the present invention.

FIG. 4b illustrates a block schematic diagram of the operation of gathering and aggregating operation metric data employing a metric aggregation system 82. A metric monitor component 80 employs a time aggregation or collapsing component to aggregate or collapse metric data based on a specific time period prior to storing the metric data to the data store 64. The metric aggregation component 82 then aggregates or coalesces the metric data for the plurality of members forming the entity by employing an entity aggregation component 83. Therefore, metric data can be aggregated or collapsed over time and then aggregated or coalesced over members to provide a manageable result set for the entity as a whole.

Figure 5:
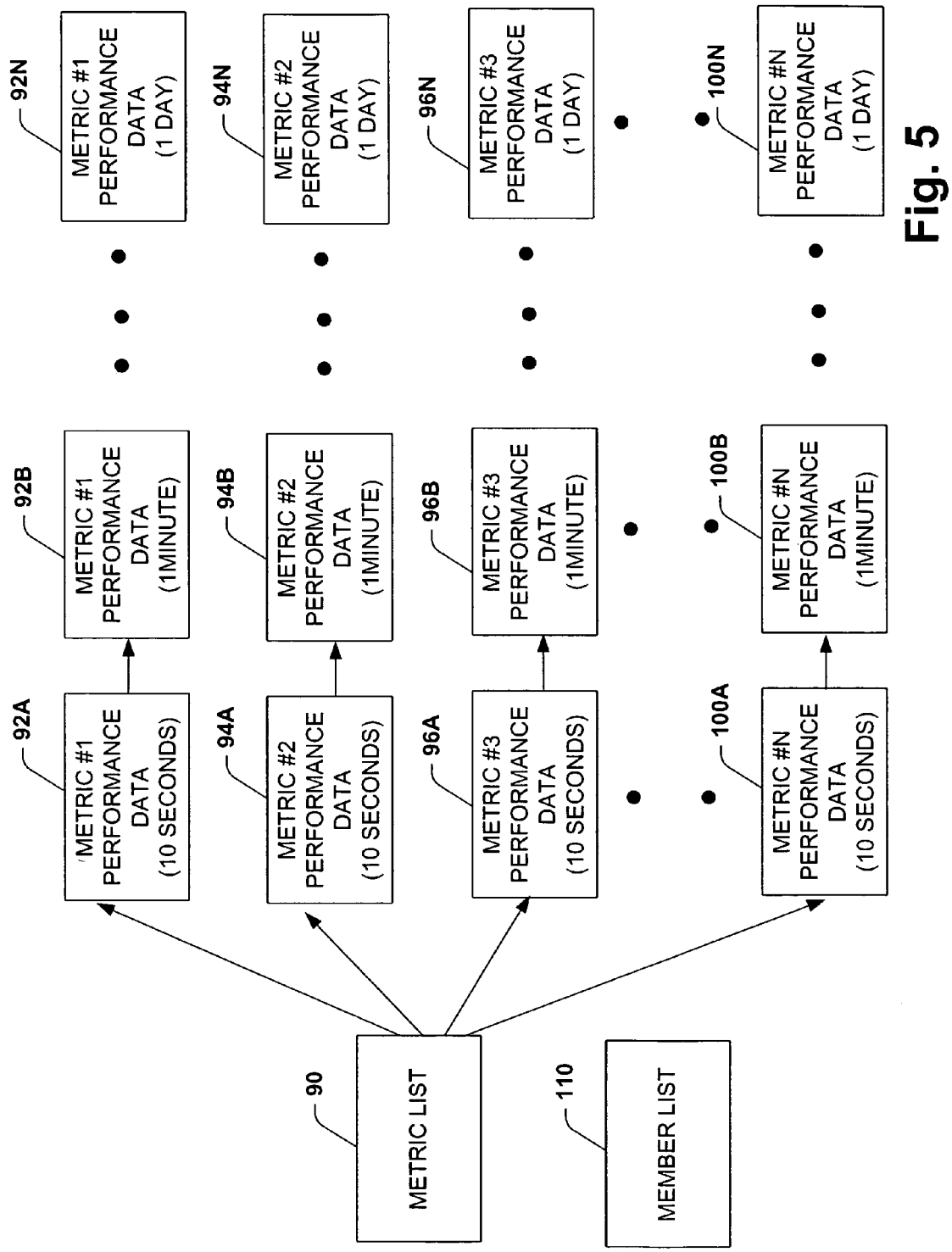
FIG. 5 is a block diagram illustrating aggregation with respect to time of performance data for different time periods and resolutions residing in a data store in accordance with one aspect of the present invention.

Referring to FIG. 4b and FIG. 5, an example will be discussed with respect to applying the components of FIG. 4b to the gathering and aggregation of performance metric data. The metric monitor component 80 logs performance metric data periodically based on a predefined time interval to the data store 64. The performance metric data is stored in separate predefined time periods for each metric. The performance metric data stored for each metric can be based on a time period defined by a timer event (not shown). The member time aggregation component 81 dynamically collapses or aggregates performance metric data to larger time periods and larger time resolutions from a first stored period containing a resolution based on the predefined time interval of the timer event. For example, FIG. 5 illustrates a number of stored time periods residing in the data store 64. The metric monitor component 80 logs a metric list 90, a member list 110 and ten second performance data stored for each metric being logged. The ten second performance metric data is stored for metric #1 92A, metric #2 94A, metric #3 96A up to metric #N 100A. The ten second metric performance data includes performance metric data logged every ten seconds defined by the event timer. The time aggregation component 81 then dynamically updates performance metric data for data of larger time periods and resolutions employing the ten second tables. FIG. 5 illustrates that the ten second data is aggregated up to one minute performance metric data 92B, 94B, 96B up to 100B, which is then aggregated to additional performance metric data, all the way up to one day performance metric data 92N, 94N, 96N up to 100N.

Referring again to FIG. 4b, the metric aggregation system 82 will receive a request from an interface or an internal or external source to gather performance information on a metric over a certain time period for either a particular member or for the entity as a whole. The metric aggregation system 82 will then access or query a particular performance metric data time resolution relating to the time period to be displayed for that metric over a single member or over all members. If the request is for performance metric data for the entity, the entity aggregation component 83 will aggregate the metric over the members to find a single performance value for a range of data points over a particular resolution. The aggregated values will then be transformed to appropriate data points for the particular time period and resolution requested. A result set of the aggregated and transformed values will then be transmitted back to the interface or source.

Figure 6A:
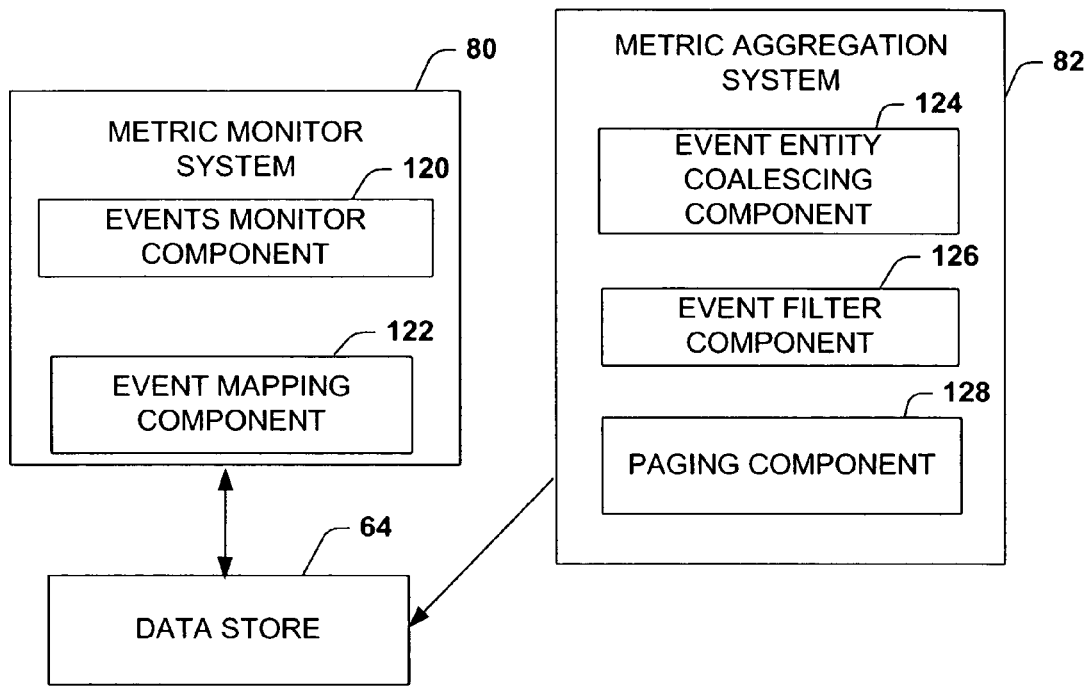
FIG. 6a is a schematic block diagram illustrating gathering and aggregation of events in accordance with one aspect of the present invention.

FIG. 6a illustrates a block schematic diagram of the operation of gathering and aggregation as it relates to event monitoring and coalescing of event data employing the metric aggregation system 82. The metric monitor system 80 employs an events monitor component 120 to log event data for each specified event type in an event table in the data store 64. The events to be logged are determined by an event configuration. The event data can include a timestamp, a unique identification number (GUID) specific to that event, a member at which the event occurred and data specific to that event. Message templates relating to the event are stored in a message table in the data store 64. The event data is mapped to fields of the event tables and message tables utilizing an event mapping component 122. When an event is retrieved by the metric aggregation system 82, data from the events table and the message table are joined and the message template is filled in (e.g., by insertion strings) from properties in the data field from the events table. The filled in message templates are returned to the event aggregation system 82 in the form of an event short message and an event long message. An event short message relates to a short description of the event, while an event long message relates to a longer more detailed description of the event.

The metric aggregation system 82 will receive a request from a requestor (e.g., an interface or a source) to receive event information over a certain time period for either a particular member or for the entity as a whole. The metric aggregation systems 82 can then access or query event information relating to the time period to be received for a single member or over all members. The metric aggregation system 82 includes an event entity coalescing component 124 adapted to coalesce event data into a single event result set for a particular time period requested by the interface. A filter component 126 can be employed to limit the event types to be retrieved by the metric aggregation systems 82. The GUID represents a bookmark into the coalesced unified result set. Therefore, the interface and a paging component 128 can maintain a record of the first and last event of the received coalesced unified result set. The GUID can then be employed to retrieve subsequent and previous portions of the coalesced result set acting as a virtual bookmark into the result set. To retrieve details on a single event the interface can make a second query specifying a specific event GUID which can identify the source for which the event occurred. The event entity coalescing component 124 will retrieve information from the events message table for that specific event GUID and member and return the information to the requestor.

Figure 6B:
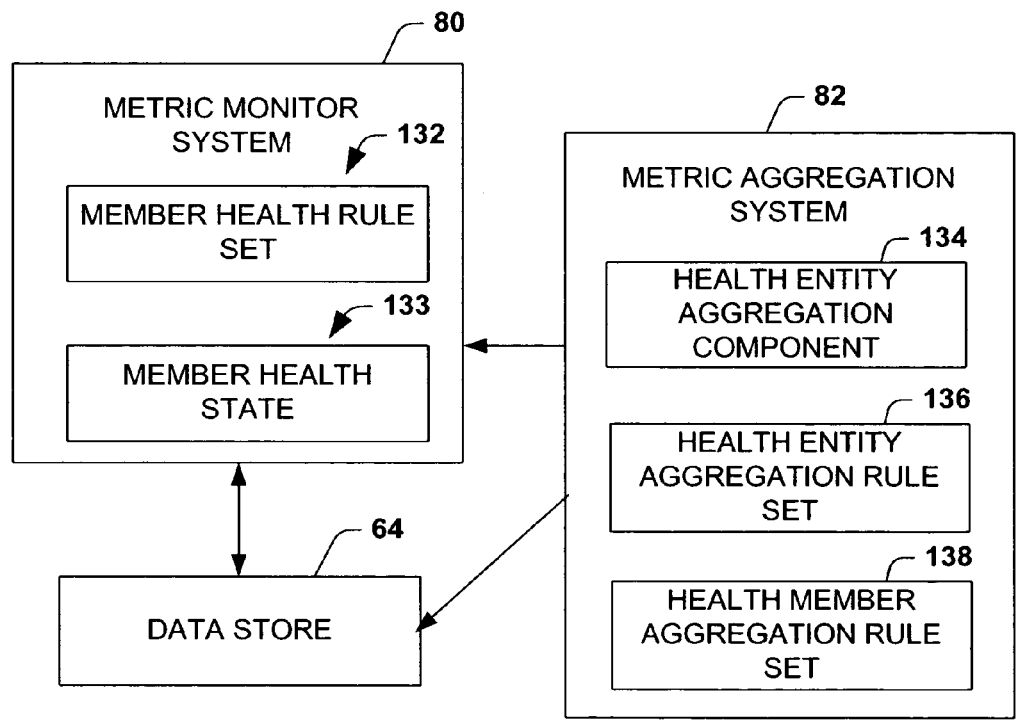
FIG. 6b is a schematic block diagram illustrating gathering and aggregation of health status in accordance with one aspect of the present invention.

FIG. 6b illustrates a block schematic diagram of the operation of gathering and aggregation as it relates to health monitoring and health data employing the metric aggregation system 82. The metric monitor system monitors metric data and one or more member health states 133 are determined based on the metric data and a member health rule set 132. The member health states 133 are a compressed hierarchy of states based on a set of rules. The metric aggregation system 82 will then poll one or more health states from the plurality of members. The metric aggregation system 82 includes a health entity aggregation component 134 adapted to aggregate the top level health status of each member or the status of the various health states for a single member. The health entity aggregation component 134 can then determine the health of the entity based on a health entity aggregation rule set 136. Alternatively, the health entity aggregation component 134 can poll health, state or performance metrics directly from the members or the data store 64 of the members, aggregate the metrics and determine an aggregated health of the entity based on a health member aggregation rule set 138.

Figure 7A:
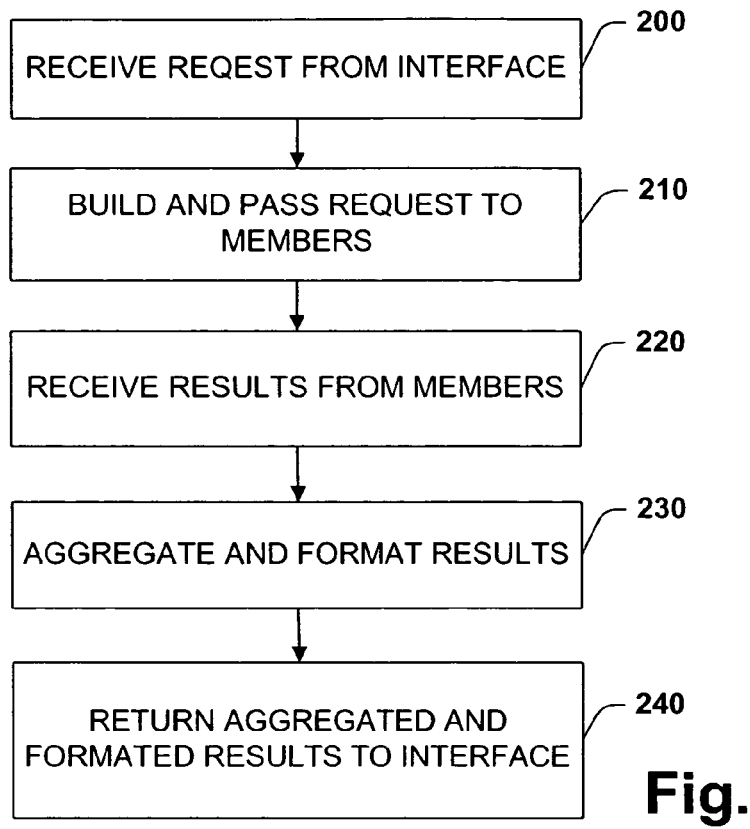
FIG. 7a is a flow diagram illustrating operational metric aggregation in accordance with one aspect of the present invention.

FIG. 7a illustrates one particular methodology for aggregation of operation data employing the operation gathering and aggregation system 58 of the present invention. In step 200, the operation aggregation system 58 receives a request for operation data from the interface 56. In step 210, the operation gathering and aggregation system 58 builds a query based on parameters received from the interface 56 and passes the query to the members 60. The operation aggregation system 58 then receives the results on the query from the members 60 in step 220 in the form of an array of record sets. The operation gathering aggregation system 58 then aggregates and formats the results for the interface in step 230. For example, the operation aggregation system 58 gathers the record sets from each member into a single result set of the entity, applies necessary transformation (e.g., average across members), interpolation (e.g., average 600 data points to 100) and provides sorting (e.g., order by time). The aggregated and formatted results are then returned to the interface in step 240.

Figure 7B:
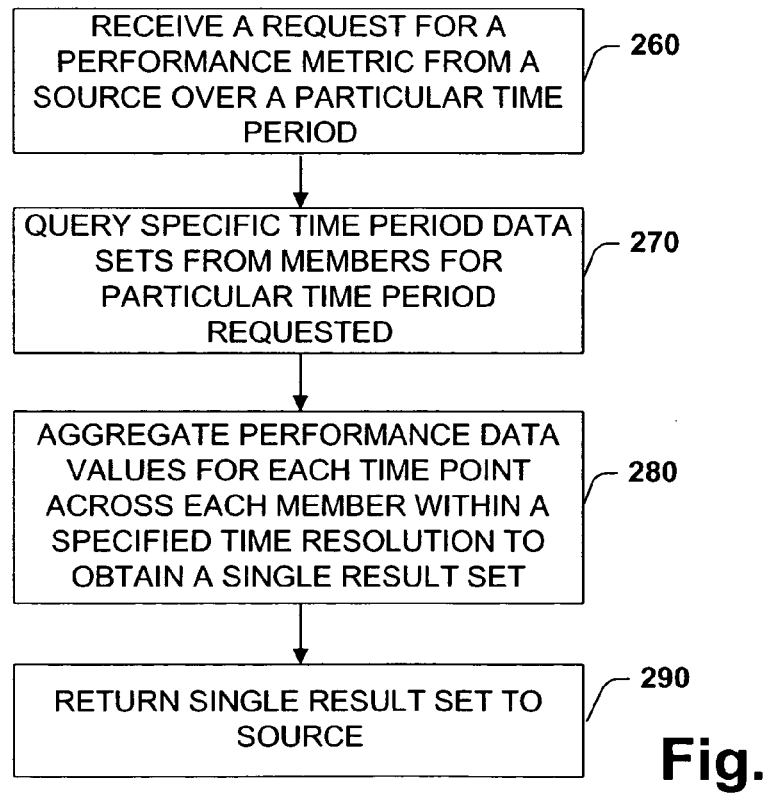
FIG. 7b is a flow diagram illustrating performance metrics aggregation in accordance with one aspect of the present invention.

FIG. 7b illustrates one particular methodology for gathering and aggregation of performance data employing the operation gathering and aggregation system 58 of the present invention. In step 260, the gathering and aggregation system 58 receives a request from a source (e.g., an internal or external process, an external consumer, a user interface, another entity) for a performance metric over a particular time period. In step 270, the operation aggregation system 58 queries the members for specific time period data sets for the particular time period requested. In step 280, the operation gathering and aggregation system 58 aggregates the performance data values for each time point across each member within a specified time resolution to obtain a single result set for the entire entity. In step 290, the single result set is returned to the source.

Figure 7C:
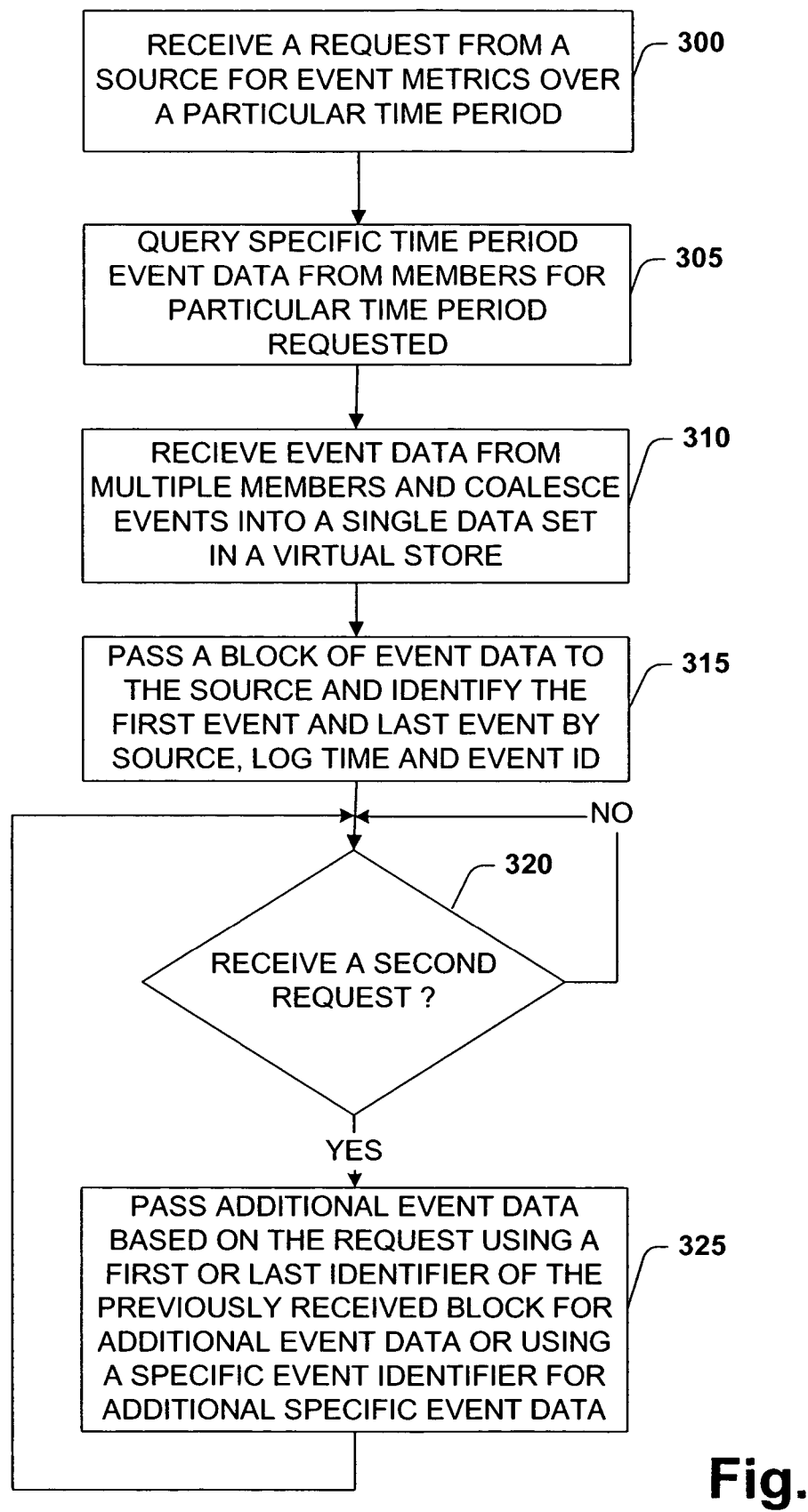
FIG. 7c is a flow diagram illustrating event metrics aggregation in accordance with one aspect of the present invention.

FIG. 7c illustrates one particular methodology for gathering and coalescing of event data employing the operation gathering and aggregation system 58 of the present invention. In step 300, the gathering and aggregation system 58 receives a request from the interface 56 for event metrics over a particular time period. In step 305, the operation aggregation system 58 queries the members for specific time period event data for the particular time period requested. In step 310, the event data from multiple members 60 falling within the time period requested by the interface 56 is coalesced and stored temporarily in a virtual store. In step 315, the operation gathering and aggregation system 58 retrieves and passes a block or portion of coalesced event data to the interface 56. In step 320, the operation gathering and aggregation system 58 monitors whether or not a second request for an additional block of data or details on a specific event have been received from the interface 56. If the operation gathering and aggregation system 58 does not receive a second request (NO), the gathering and aggregation system 58 continues monitoring for a second request in step 320. If the operation gathering and aggregation system 58 does receive a second request (YES), the gathering and aggregation system 58 retrieves and passes an additional block of event data using a first or last event identifier of the previously received block of data or retrieves and passes event specific data using a specific event identifier in step 325. The event identifier provides for data from multiple sources to be coalesced into a virtual data set in addition to a method for acquiring more data relative to an event result set or a particular event in a virtual data set.

Figure 7D:
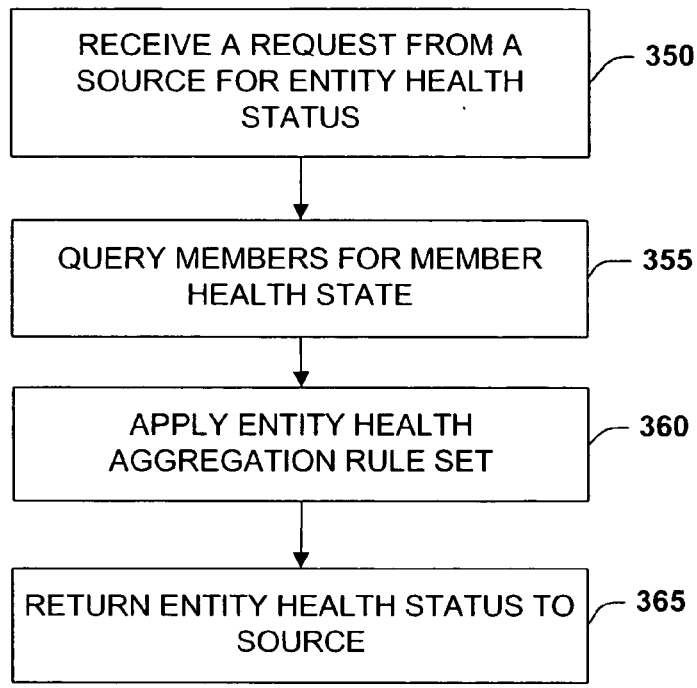
FIG. 7d is a flow diagram illustrating health metrics aggregation in accordance with one aspect of the present invention.

FIG. 7d illustrates one particular methodology for gathering and aggregation employing the operation gathering and aggregation system 58 as it relates to health monitoring. In step 350, the gathering and aggregation system 58 receives a request from a source (e.g., an internal or external process, an external consumer, a user interface, another entity) for health status of the entity. In step 355, the operation aggregation system 58 queries the members for health status. In step 360, the operation gathering and aggregation system 58 applies the entity health aggregation rule set 136 to determine a health state of the entity. In step 365, the operation gathering and aggregation system 58 then returns the entity health status to the source.

Figure 7E:
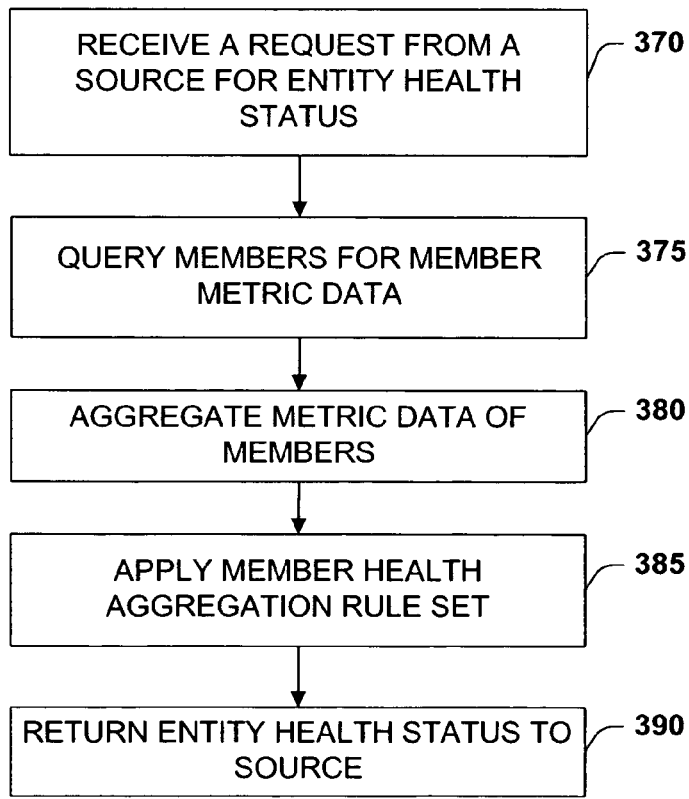
FIG. 7e is a flow diagram illustrating health metrics aggregation in accordance with another aspect of the present invention.

FIG. 7e illustrates another particular methodology for gathering and aggregation employing the operation gathering and aggregation system 58 as it relates to health monitoring. In step 370, the gathering and aggregation system 58 receives a request from a source (e.g., an internal or external process, an external consumer, a user interface, another entity) for health status of the entity. In step 375, the operation aggregation system 58 queries the members for member metric data. In step 380, the operation gathering and aggregation system 58 aggregates the metric data of the members. In step 385, the operation gathering and aggregation system 58 applies the member health aggregation rule set 138 to determine a health state of the entity. In step 390, the operation gathering and aggregation system 58 then returns the entity health status to the source.

Figure 8:
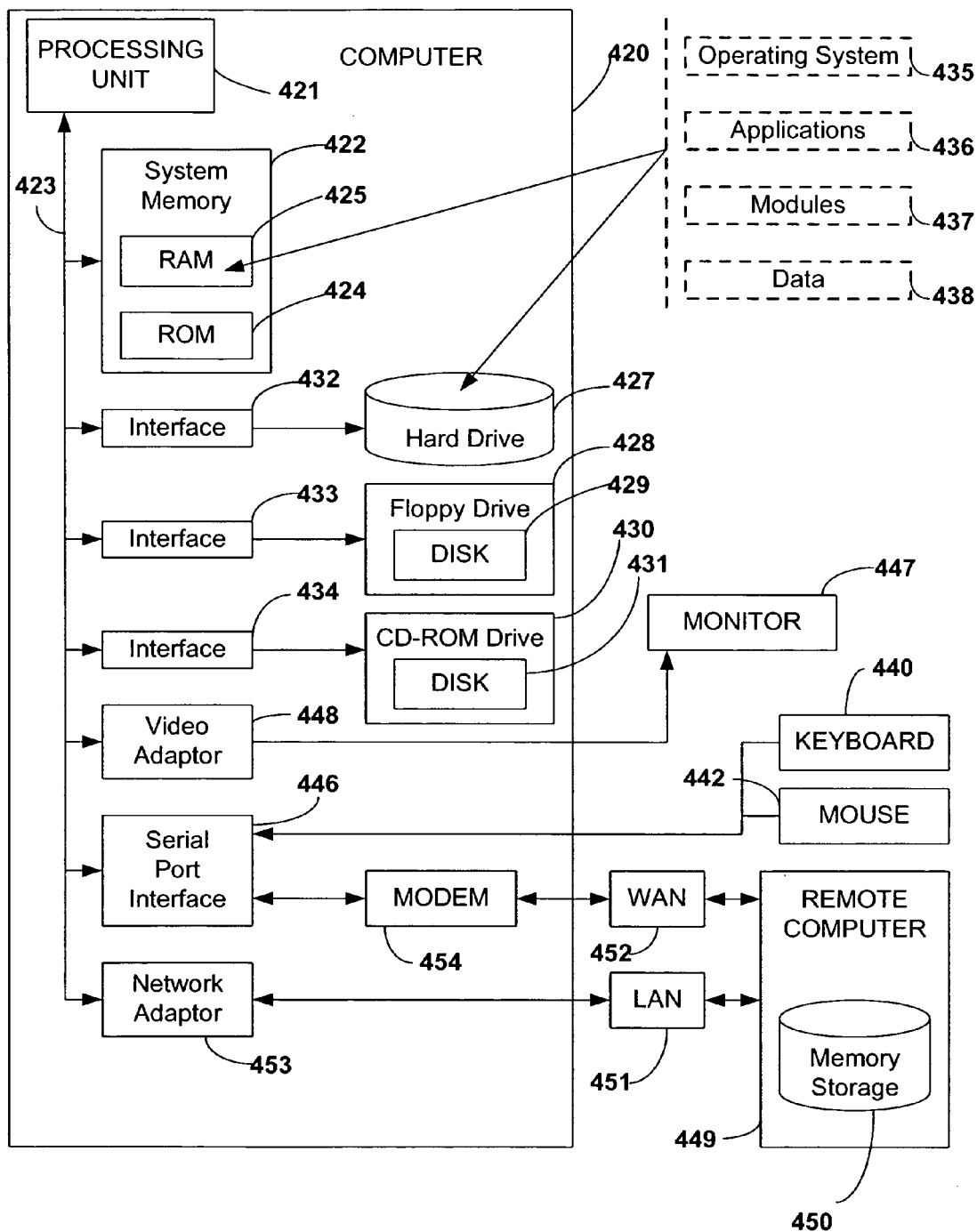
FIG. 8 illustrates a block diagram of a system in accordance with an environment of the present invention.

In order to provide a context for the various aspects of the invention, FIG. 8 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, handheld computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 8, an exemplary system for implementing the various aspects of the invention includes a conventional computer 420, including a processing unit 421, a system memory 422, and a system bus 423 that couples various system components including the system memory to the processing unit 421. The processing unit may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also may be employed as the processing unit 421.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 424 and random access memory (RAM) 425. A basic input/output system (BIOS), containing the basic routines that help to transfer information between elements within the server computer 420, such as during start-up, is stored in ROM 424.

The computer 420 further includes a hard disk drive 427, a magnetic disk drive 428, e.g., to read from or write to a removable disk 429, and an optical disk drive 430, e.g., for reading a CD-ROM disk 431 or to read from or write to other optical media. The hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide nonvolatile storage of data, data structures, computer-executable instructions, etc. for the server computer 420. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 425, including an operating system 435, one or more application programs 436, other program modules 437, and program data 438. The operating system 435 in the illustrated computer may be a Microsoft operating system (e.g., Windows NT operating system). It is to be appreciated that other operating systems may be employed such as UNIX for example.

A user may enter commands and information into the server computer 420 through a keyboard 440 and a pointing device, such as a mouse 442. Other input devices (not shown) may include a microphone, a joystick, a game pad, a satellite dish, a scanner, or the like. These and other input devices are often connected to the processing unit 421 through a serial port interface 446 that is coupled to the system bus, but may be connected by other interfaces, such as a parallel port, a game port or a universal serial bus (USB). A monitor 447 or other type of display device is also connected to the system bus 423 via an interface, such as a video adapter 448. In addition to the monitor, computers typically include other peripheral output devices (not shown), such as speakers and printers.

The computer 420 may operate in a networked environment using logical connections to one or more remote computers, such as a remote client computer 449. The remote computer 449 may be a workstation, a server computer, a router, a peer device or other common network node, and typically includes many or all of the elements described relative to the server computer 420, although only a memory storage device 450 is illustrated in FIG. 8. The logical connections depicted in FIG. 8 include a local area network (LAN) 451 and a wide area network (WAN) 452. Such networking environments are commonplace in offices, enterprise-wide computer networks, intranets and the Internet.

When employed in a LAN networking environment, the server computer 420 may be connected to the local network 451 through a network interface or adapter 453. When utilized in a WAN networking environment, the server computer 420 generally may include a modem 454, and/or is connected to a communications server on the LAN, and/or has other means for establishing communications over the wide area network 452, such as the Internet. The modem 454, which may be internal or external, may be connected to the system bus 423 via the serial port interface 446. In a networked environment, program modules depicted relative to the computer 420, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the computer 420, unless otherwise indicated. Such acts and operations are sometimes referred to as being computer-executed. It will be appreciated that the acts and symbolically represented operations include the manipulation by the processing unit 421 of electrical signals representing data bits which causes a resulting transformation or reduction of the electrical signal representation, and the maintenance of data bits at memory locations in the memory system (including the system memory 422, hard drive 427, floppy disks 429, and CD-ROM 431) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for gathering and aggregating operational metrics for server computers configured to act as a single logical entity, the system comprising:

a plurality of server computers configured to act as a single logical entity, the single logical entity configured to serve data in response to requests from client computers, each of the plurality of server computers being configured to receive a request for an operational metric for the single logical entity as a whole and to provide the operational metric for the single logical entity as a whole in response to the request, the plurality of server computers including:

a first server computer including at least one processor, system memory and a first interface, the first server computer being configured to:

receive, via the first interface, a first request for a first operational health metric for the single logical entity as a whole;

build a first query based on parameters of the first request received via the first interface;

query each of the plurality of server computers that are configured to act as a single logical entity based on the first query;

aggregate results of the first query to create the requested first operational health metric for the single logical entity as a whole; and aggregate the first operational health metric into at least one of a single result state based on a first set of predefined rules; and a second server computer including at least one processor, system memory and a second interface, the second server computer being configured to:

receive, via the second interface, a second request for a second operational health metric for the single logical entity as a whole;

build a second query based on parameters of the second request received via the second interface;

query each of the plurality of server computers that are configured to act as a single logical entity based on the second query; and aggregate results of the second query to create the requested second operational health metric for the single logical entity as a whole; and aggregate the second operational health metric into at least one of a single result state based on a second set of predefined rules.

2. The system of claim 1, wherein the first operational health metric is at least one of a performance metric, an event metric, a status metric and a health metric.

3. The system of claim 1, wherein the first server computer is adapted to aggregate the first operational health metric over time to form a first unified result set; and wherein the second server computer is adapted to aggregate the second operational health metric over time to form a second unified result set.

4. The system of claim 3, wherein the first server computer is further adapted to aggregate the first operational health metric into data of at least one time period and time resolution to form the first unified result set; and wherein the second server computer is further adapted to aggregate the second operational health metric into data of at least one time period and time resolution to form the second unified result set.

5. The system of claim 4, wherein the first server computer is further adapted to take one of an average, a minimum, a maximum, and a weighted average of the data.

6. The system of claim 1, wherein the first operational health metric is an operational event metric and the first server computer is adapted to coalesce events from the plurality of server computers that are configured to act as a single logical entity to form a first unified result set; and wherein the second operational health metric is an operational event metric and the first server computer is adapted to coalesce events from the plurality of server computers that are configured to act as a single logical entity to form a second unified result set.

7. The system of claim 1, wherein the first server computer is configured to determine a server computer health state for each of the plurality of server computers based on a server computer specific health rule set, to query each of the server computer health states from the plurality of server computers and to apply a health entity aggregation rule set to determine a health state of the single logical entity.

8. The system of claim 1, wherein the first server computer is configured to apply a health member aggregation rule set to a unified result set to determine a health state of the single logical entity.

9. A system for gathering and aggregating operational metrics for server computers configured to act as a single logical entity, the system comprising:

a plurality of server computers configured to act as a single logical entity, the single logical entity configured to serve data in response to requests from client computers, each of the plurality of server computers being configured to receive a request for an operational metric for the single logical entity as a whole and to provide the operational metric for the single logical entity as a whole in response to the request, the plurality of server computers including:

a first server computer including at least one processor, system memory and a first interface, the first server computer being configured to:

receive, via the first interface, a first request for a first operational health metric for the single logical entity as a whole;

execute a first query of each of the plurality of server computers based on parameters of the first request;

aggregate results of the first query to create the requested first operational health metric for the single logical entity as a whole; and aggregate the first operational health metric into at least one of a single result state based on a first set of predefined rules; and a second server computer including at least one processor, system memory and a second interface, the second server computer being configured to:

receive, via the second interface, a second request for a second operational health metric for the single logical entity as a whole;

execute a second query of each of the plurality of server computers based on parameters of the second request;

aggregate results of the second query to create the requested second operational metric for the single logical entity as a whole; and aggregate the second operational health metric into at least one of a single result state based on a second set of predefined rules.

10. The system of claim 9, wherein the first operational metric is at least one of a performance metric, an event metric, a status metric and a health metric.

11. The system of claim 9, wherein the first server computer is adapted to aggregate the first operational health metric over time to form a first unified result set; and wherein the second server computer is adapted to aggregate the second operational health metric over time to form a second unified result set.

12. The system of claim 11, wherein the first server computer is further adapted to aggregate the first operational health metric into data of at least one time period and time resolution to form the first unified result set; and wherein the second server computer is further adapted to aggregate the second operational health metric into data of at least one time period and time resolution to form the second unified result set.

13. The system of claim 9, wherein the first operational health metric is an operational event metric and the first server computer is adapted to coalesce events from the plurality of server computers that are configured to act as a single logical entity to form a first unified result set; and wherein the second operational health metric is an operational event metric and the first server computer is adapted to coalesce events from the plurality of server computers that are configured to act as a single logical entity to form a second unified result set.

14. The system of claim 9, wherein the first server computer is configured to determine a server computer health state for each of the plurality of server computers based on a server computer specific health rule set, to query each of the server computer health states from the plurality of server computers and to apply a health entity aggregation rule set to determine a health state of the single logical entity.

15. The system of claim 9, wherein the first server computer is configured to apply a health member aggregation rule set to a unified result set to determine a health state of the single logical entity.

16. A method for gathering and aggregating operational metrics for a plurality of server computers configured to act as a single logical entity, the single logical entity configured to serve data in response to requests from client computers, each of the plurality of server computers being configured to receive a request for an operational metric for the single logical entity as a whole and to provide the operational metric for the single logical entity as a whole in response to the request, the plurality of server computers including a first server computer and a second server computer, the first server computer including at least one processor, system memory, and a first interface, the second server computer including at least one processor, system memory, and a second interface, the method comprising:

at the first server computer:
receiving, via the first interface, a first request for a first operational health metric for the single logical entity as a whole;
executing a first query of each of the plurality of server computers based on parameters of the first request;
aggregating results of the first query to create the requested first operational health metric for the single logical entity as a whole; and
aggregating the first operational health metric into at least one of a single result state based on a first set of predefined rules; and at the second server computer:
receiving, via the second interface, a second request for a second operational health metric for the single logical entity as a whole;
executing a second query of each of the plurality of server computers based on parameters of the second request;
aggregating results of the second query to create the requested second operational health metric for the single logical entity as a whole; and
aggregating the second operational health metric into at least one of a single result state based on a second set of predefined rules.

* * * * *